(12) United States Patent
Zimet-Rubner et al.

(10) Patent No.: US 9,014,469 B2
(45) Date of Patent: Apr. 21, 2015

(54) COLOR-MAPPING WAND

(71) Applicants: Yael Zimet-Rubner, Shoham (IL); Alina Livne, Rakefet (IL); Avraham Yair Rubner, Petach Tikva (IL)

(72) Inventors: Yael Zimet-Rubner, Shoham (IL); Alina Livne, Rakefet (IL); Avraham Yair Rubner, Petach Tikva (IL)

(*) Notice: Subject to any disclaimer, the term of this patent is extended or adjusted under 35 U.S.C. 154(b) by 121 days.

(21) Appl. No.: 13/666,556

(22) Filed: Nov. 1, 2012

(65) Prior Publication Data

US 2014/0119645 A1    May 1, 2014

(51) Int. Cl.
*G06K 9/00*  (2006.01)
*G01J 3/00*  (2006.01)
*G06F 3/03*  (2006.01)

(52) U.S. Cl.
CPC ... *G01J 3/00* (2013.01); *G06F 3/03* (2013.01); *G06F 3/0304* (2013.01)

(58) Field of Classification Search
USPC ........... 382/162, 165, 274; 348/453; 345/589, 345/593, 597, 605
See application file for complete search history.

(56) References Cited

U.S. PATENT DOCUMENTS

| | | | |
|---|---|---|---|
| 5,661,506 A | | 8/1997 | Lazzouni et al. |
| 6,518,950 B1 | * | 2/2003 | Dougherty et al. ........... 345/156 |
| 2006/0028400 A1 | * | 2/2006 | Lapstun et al. .................... 345/8 |
| 2009/0323037 A1 | * | 12/2009 | Aarts et al. ....................... 355/67 |
| 2010/0001998 A1 | | 1/2010 | Mandella et al. |
| 2011/0018903 A1 | * | 1/2011 | Lapstun et al. ............... 345/633 |
| 2012/0075343 A1 | * | 3/2012 | Chen et al. .................... 345/633 |
| 2012/0249482 A1 | | 10/2012 | Kiyose |

FOREIGN PATENT DOCUMENTS

| | | |
|---|---|---|
| WO | WO 02/42993 A1 | 5/2002 |
| WO | WO 2006/043286 A1 | 4/2006 |
| WO | WO 2010/071827 A2 | 6/2010 |
| WO | WO 2012/140646 | 10/2012 |

OTHER PUBLICATIONS

International Search Report for Application No. PCT/IL2013/050889, mailed on Feb. 2, 2014.

* cited by examiner

*Primary Examiner* — Ali Bayat
(74) *Attorney, Agent, or Firm* — Pearl Cohen Zedek Latzer Baratz LLP

(57) ABSTRACT

A device includes a freely manipulable color-mapping wand. The wand includes at least one color detector for measuring an intensity of light within at least one spectral range that is incident from a region of a surface. A navigation sensor produces a signal that is interpretable to yield a position of at least a portion of the color-mapping wand.

5 Claims, 6 Drawing Sheets

COLOR-MAPPING WAND

FIELD OF THE INVENTION

The present invention relates to color mapping of a surface. More particularly, the present invention relates to a color-mapping wand and a method for color mapping of a surface using the wand.

BACKGROUND OF THE INVENTION

It is often convenient to acquire a digital representation of a surface or object. Such digital representations may be stored on a digital data storage medium for later recall, reference, or manipulation. A digital representation may be stored or archived in a compact form, may be sent electronically from one computer to another, may be rendered for display on a computer screen or monitor, or may be otherwise digitally manipulated by a suitable computer application.

For example, a displayable digital representation of a surface or object may be rotated so as to display different views of the object. Other factors that affect the appearance of a surface or object may also be manipulated, such as illumination and surface coloring.

Many types of scanners are widely available for acquiring a digital representation of a planar surface. However, acquisition of a digital representation of a surface of a three-dimensional often involves complex setups. For example, digital photographs of an object taken from various directions may be digitally combined to yield a three-dimensional representation of the object. Interactions of multiple beams of electromagnetic radiation may be analyzed to produce a three-dimensional topological map of an object.

Techniques have been described for detecting a position of an object or tool on a surface under certain circumstances. For example, a pressure-sensitive surface may determine where a tool is pressing against a surface. Measurement of electrical resistance between an electrically conducting tool and known points on a surface of known resistivity may be analyzed to determine a position of the tool relative to those points.

It is an object of embodiments of the present invention to provide a simple device and method for acquiring a digital representation of a surface of an object, e.g. for use by a child or other user without specialized training.

Other aims and advantages of embodiments of the present invention will become apparent after reading the present description and reviewing the accompanying drawings.

SUMMARY OF THE INVENTION

There is thus provided, in accordance with some embodiments of the present invention, a device including a freely manipulable color-mapping wand, the wand including at least one color detector for measuring an intensity of light within at least one spectral range that is incident from a region of a surface, and a navigation sensor to produce a signal that is interpretable to yield a position of at least a portion of the color-mapping wand.

Furthermore, in accordance with some embodiments of the present invention, the navigation sensor includes at least one fiducial marker detector for detecting a fiducial marker on the surface.

Furthermore, in accordance with some embodiments of the present invention, the fiducial marker detector includes a plurality of fiducial marker detectors, each fiducial marker detector being configured to detect a fiducial marker that is located in a different region of the surface.

Furthermore, in accordance with some embodiments of the present invention, the fiducial marker detector is configured to acquire an image of the fiducial marker in a visible or in a non-visible spectral range.

Furthermore, in accordance with some embodiments of the present invention, the color detector includes a plurality of color detectors wherein each color detector is configured to measure an intensity of light that originates from a different region of the surface.

Furthermore, in accordance with some embodiments of the present invention, the color detector includes a plurality of color detectors wherein each color detector is configured to measure an intensity of light in a different spectral range.

Furthermore, in accordance with some embodiments of the present invention, the navigation sensor includes a sensor selected from a list of sensors consisting of a linear accelerometer, a rotation rate sensor, a gyroscope, a compass, and an inertial measurement unit.

Furthermore, in accordance with some embodiments of the present invention, the device further includes a component selected from a list of components consisting of a pressure sensor, a display device, an audio output device, an imaging device, and a user-operable control.

Furthermore, in accordance with some embodiments of the present invention, the device includes a color applicator for applying a color to the surface.

Furthermore, in accordance with some embodiments of the present invention, the color applicator is detachable from the wand.

There is further provided, in accordance with some embodiments of the present invention, a color-mapping method including: operating a color detector of a freely manipulable color-mapping wand to measure an intensity of light that is incident from a region of a surface in each of a plurality of spectral regions; calculating a color of the region based on the measured intensity; operating a navigation sensor of the wand to measure a quantity that is interpretable to yield a position of the wand; determining a location of the region based on the measured quantity; and incorporating the calculated color into a representation of a colored surface at a position that corresponds to the determined location.

Furthermore, in accordance with some embodiments of the present invention, operating the navigation sensor includes sensing a fiducial marker of a plurality of distributed fiducial markers.

Furthermore, in accordance with some embodiments of the present invention, determining the location includes interpreting an acquired image of the fiducial marker, each fiducial marker including a pattern that is distinguishable from a pattern of another of the fiducial markers.

Furthermore, in accordance with some embodiments of the present invention, the pattern includes a matrix barcode.

Furthermore, in accordance with some embodiments of the present invention, sensing the fiducial marker includes concurrently sensing two or more of the fiducial markers.

Furthermore, in accordance with some embodiments of the present invention, operating the navigation sensor includes measuring a vector acceleration of the wand and determining the location comprises integrating the measured vector acceleration over time.

Furthermore, in accordance with some embodiments of the present invention, the method further includes placing the wand at an initial position to establish a reference location.

Furthermore, in accordance with some embodiments of the present invention, the method includes performing a calibration measurement that includes operating the color detector to measure an intensity of light that is incident from a calibration surface, and wherein calculating the color of the region includes adjusting the calculated color on the basis of a result of the calibration measurement.

Furthermore, in accordance with some embodiments of the present invention, the color detector is operated concurrently with the navigation sensor such that the region of the surface whose color is calculated substantially corresponds to the determined location.

Furthermore, in accordance with some embodiments of the present invention, the color detector is operated at a separate time from operation of the navigation sensor, and wherein incorporating the calculated color into the representation includes applying the calculated color to a position in the representation that corresponds to a current determined location.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
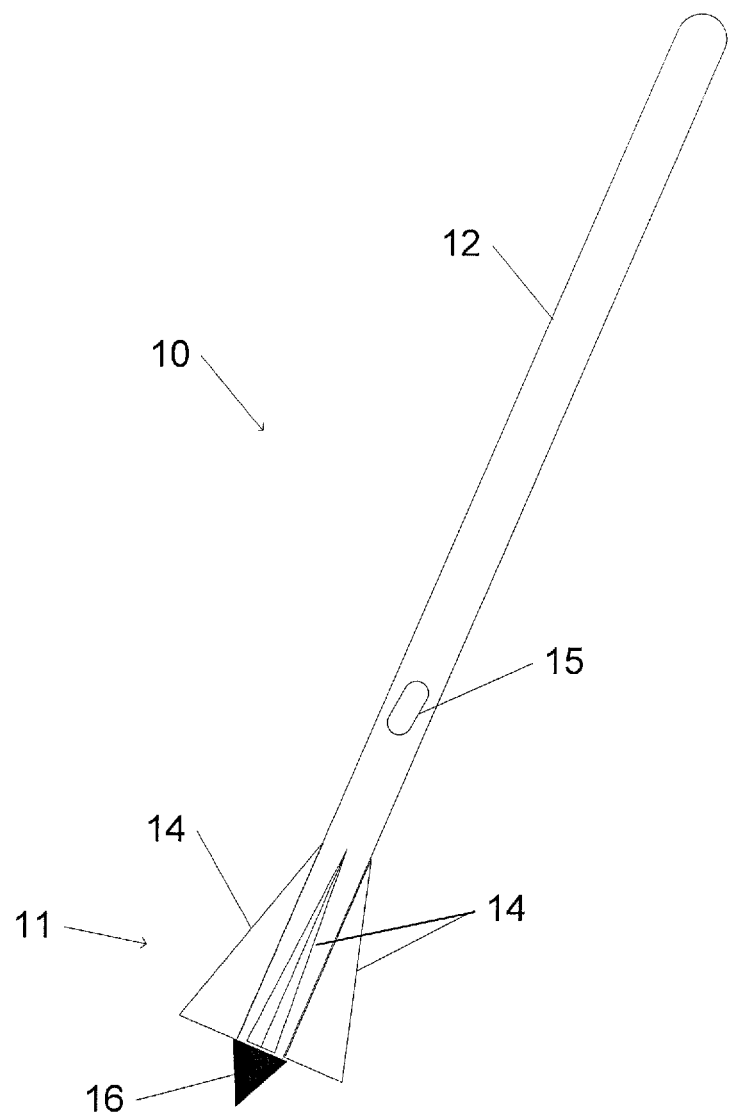
FIG. 1 schematically shows a color-mapping wand, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In accordance with embodiments of the present invention, a color-mapping wand is capable of forming a digital representation of parts of a surface, such as a surface of a three-dimensional object. The color-mapping wand includes one or more color sensors for measuring the color of the surface. The color-mapping wand includes one or more navigation sensors for enabling a processor that is associated with the color-mapping wand to determine a position of the wand relative to the surface (or to another coordinate system or reference point) when the color was measured. Although a color-mapping wand as described herein may be elongated, other shapes are possible. For example, the color-mapping wand, or components of the color-mapping wand, may be in the form of a sphere, spheroid, or other regularly or irregularly curved object, or in the form of a (regular or irregular) polyhedral shape. The shape may be determined by ergonomic or other considerations, or in imitation of a tool that is to be emulated. All such shapes are to be understood as being included in the term "wand" as used herein.

The color-mapping wand is capable of being handheld and is freely manipulable. As used herein, a measurement device or apparatus (such as a color-mapping wand in accordance with embodiments of the present invention) is considered to be "freely manipulable" if it can be moved or reoriented in an unconfined manner, at least within an area or volume in which measurements are to be made. (For example, a volume may be limited by a connection to another device, such as a processor, with which the measurement device communicates, e.g. by a length of a connection wire or a range of a wireless connection.) A freely manipulable device is not confined by a track or framework (as would be, for example, a typical computer scanner).

The color-mapping wand includes one or more navigation sensors. Each navigation sensor is configured to sense a quantity that may be interpreted or analyzed (e.g. in light of additional data) to yield a position of the color-mapping wand when a color measurement of the surface is made. The navigation sensor may be self contained, or may operate via interaction with one or more external devices or objects.

For example, a self-contained navigation sensor may include, a motion sensor (e.g. accelerometer, gyroscope) or an orientation sensor (e.g. level, compass, gyroscope) for measuring motion or orientation of the color-mapping wand. A navigation sensor that operates through interaction with other objects may include, for example, a sensor for sensing fiducial marks (e.g. contact, electromagnetic, optical, acoustic), a sensor for sensing a distance from one or more surfaces (e.g. optical, acoustic, electromagnetic), or a transmitter or receiver for triangulation (e.g. radio or other electromagnetic).

In accordance with some embodiments of the present invention, the object surface may be marked with an array of fiducial markers. Each fiducial marker on the surface is unique and distinguishable from other fiducial markers. For example, one fiducial marker may be distinguishable from others of the fiducial markers by a distinguishable pattern. As another example, one fiducial marker may be distinguishable from others by a spectral pattern of the marker (e.g. spectral reflectivity).

Each unique fiducial marker is associated with a location on the surface. For example, each fiducial marker may be in the form of a coded pattern, such as a matrix barcode, that encodes an indication (e.g. coordinates) of the position of that fiducial marker on the surface.

A detector end of the color-mapping wand may be placed on or near the surface. The detector end of the color-mapping wand may include one or more imaging devices (e.g. cameras) or other sensors that are capable of imaging or sensing one or more fiducial markers in the vicinity of the detector end of the color-mapping wand. A processor that is associated with the color-mapping wand may analyze the images of the fiducial markers to determine a position of the detector end of the color-mapping wand relative to the surface.

If the surface is in a simple form (e.g. planar, spherical, cylindrical) each fiducial marker may encode its position in accordance with a simple coordinate system (e.g. Euclidean, spherical, or cylindrical). The surface may be a surface of a three-dimensional arbitrarily shaped object (e.g. a model of a human face). In such a case, each fiducial marker may encode its coordinates on the surface in accordance with, for example, an appropriate two-dimensional curvilinear coordinate system. As another example, the coordinates may encode position of the fiducial marker in a three-dimensional coordinate space. As another example, the fiducial marker may encode a sequential or other identifying string of characters or symbols. The encoded string may be linked via a list or table to a coordinate or position on the surface of the object.

The fiducial markers may be designed so as not to be visible or otherwise interfere with the appearance and use of the object (e.g. act as a watermark). For example, the fiducial markers may be painted in a paint that is reflective or absorptive to electromagnetic radiation outside the visible spectral range (e.g. ultraviolet or near infrared). The imaging devices at the detector end of the color-mapping wand may be sensitive to radiation in that spectral region.

In accordance with some embodiments of the present invention, the color-mapping wand may include a navigation sensor that includes an accelerometer. The accelerometer may be configured to produce a signal (e.g. electrical currents of voltages) that indicates vector acceleration (magnitude and direction, or magnitude along predefined axes) of the detector end of the color-mapping wand. For example, the accelerometer may include a set of two or more variously oriented linear acceleration sensors that each measure acceleration along a particular axis. Vector acceleration may be constructed by calculating a vector sum of the individually measured linear accelerations.

The navigation sensor or accelerometer may include one or more orientation or rotation sensors. For example, a processor may be configured to utilize data that is sensed by a linear accelerometer and a rotation sensor to calculate vector acceleration. A processor may be configured to calculate a current position (e.g. in two or three dimensions) of the color-mapping wand relative to a known initial position of the color-mapping wand by integrating the measured vector acceleration over time. For example, an initial position may be established by placing the color-mapping wand at a known position when initializing a color-mapping application, occasionally during operation of the color-mapping application, or when indicated in accordance with predetermined circumstances. Thus, a surface for use with a color-mapping wand that is provided with an accelerometer need not include fiducial markers or any predetermined division into zones or regions.

One or more light detectors at the detector end of the color-mapping wand may measure an intensity of visible light from (e.g. reflected, scattered, or emitted by) the surface below or near the detector end of the color-mapping wand. If two or more light detectors are sensitive to different spectral ranges, analysis of signals produced by the detectors may yield a surface color of the surface. Alternatively, a single detector may be provided with multiple detecting elements that are sensitive to different spectral ranges. Alternatively, a single detector may be configured to measure light in different spectral ranges in rapid (e.g. faster than a typical or expected speed of translation of the color-mapping wand) succession (e.g. using a rotating filter wheel or other movable color separation element). The successively acquired detector signals may be analyzed to yield a color of the surface. The various spectral ranges may be broad (e.g. such that the various spectral ranges may be adjacent to, or partially overlap, one another) or may be narrow (e.g. such that there are spectral regions between the measured spectral regions that are not measured).

The color-mapping wand may include a tool for applying color to the surface or for removing color from the surface. For example, a tool at or near the detector end of the color-mapping wand may include a brush, pencil, pen, applicator, cotton, sponge (e.g. of natural or synthetic material) for applying a coloring substance (e.g. makeup, paint, ink) to the surface, or for removing a coloring substance from the surface. The tool may be permanently attached to the color-mapping wand, or may be detachable and replaceable with the same tool or with a different tool. Appropriate mechanisms may be provided (e.g. latches, pins, or threading) to enable attachment or detachment of the tool.

Concurrently with coloring the surface, the color-mapping wand may create a digital representation of the colored surface (e.g. two dimensional or three dimensional). The digital representation may then rendered as an image for display, may be digitally stored on a data storage medium or device, may be digitally transferred or transmitted to another device or person, may be made available over a network, or may be otherwise manipulated. For example, a user may manipulate digital tools to modify the color of (e.g. virtually paint or apply makeup to) the digital representation of the surface. When accessible by network, two or more users may cooperatively manipulate the digital representation.

Thus, the color-mapping wand may be configured to map the color of a surface by concurrently acquiring measurements from a navigation sensor and from the light detector.

The color-mapping wand may be configured to virtually color a surface. For example, the wand may be placed at various positions in space or on a surface in order to delineate a boundary or position of a virtual canvas or surface (e.g. a previously defined three-dimensional surface). The color-mapping wand may be placed on a colored surface (e.g. a makeup container or tray, a paint container, or a colored object) to acquire a color to be painted or applied. The color-mapping wand may then be moved to a location on the virtual canvas that is to be colored. Further movement of the color-mapping wand over a section of the virtual canvas may then change the color of (e.g. virtually paint or apply makeup to) that section of the virtual canvas to the previously acquired color. The color-mapping wand (or a device that is associated with the color-mapping wand) may be provided with one or more controls that may be operated to indicate an operation to be performed (e.g. delineate a boundary or position; acquire a color; virtually paint or apply makeup to the virtual canvas).

FIG. 1 schematically shows a color-mapping wand, in accordance with some embodiments of the present invention.

Color-mapping wand 10 includes wand shaft 12. Wand shaft 12 may be designed to be handheld conveniently by a user manipulating color-mapping wand 10. For example, wand shaft 12 may be of similar length, thickness, or weight to a handheld tool for color application or removal. Such handheld tools may include, for example, a makeup applicator or application brush, a pencil, a paint brush, a pen, sponge, or a stylus. Thus, a user who is using color-mapping wand 10 may handle color-mapping wand 10 as one would the tool for color application or removal.

One end of color-mapping wand 10, detector end 11, includes one or more detector assemblies 14. Detector end 11 of color-mapping wand 10 is designed to be held near a surface whose color is being mapped. Each detector assembly 14 may include one or more detection devices. The detection devices may include one or more navigation sensors that are configured to determine a location of detector end 11. For example, a navigation sensor may be configured to detect or image a fiducial marker on the surface being mapped. A navigation sensor may be configured to measure an acceleration of detector end 11. Some of the detection devices may be configured to detect visible light that is incident on the detection device from the surface being mapped. Detection devices or sensors may be incorporated into wand shaft 12.

Detector end 11 of color-mapping wand 10 may incorporate color applicator 16 (to be understood as including a component for color removal). Color applicator 16 may be constructed similar to a color-application end of a handheld tool for color application, for otherwise changing an appearance of the surface, or for another purpose. For example, color applicator 16 may include a brush for application of makeup or paint, a pencil for application of makeup or for coloring, a pen point or felt marking tip, a makeup applicator, a sponge or other synthetic or natural absorbent material (e.g. cotton), or other tool such as a stylus or atomizer Color applicator 16 may include a tool, such as a brush, sponge (or other absorbent object), suction device, eraser, or similar cleaning or color removal device for removing a colored material from the surface. Color applicator 16 may connect to a reservoir of color material (e.g. ink or paint) that is internal to, or external to, color-mapping wand 10. Thus, color-mapping wand 10 may be utilized to color or otherwise modify a surface while concurrently detecting a fiducial marker on the surface (or otherwise sensing or determining navigation-related data) or detecting a color of the surface. Color applicator 16 may be permanently incorporated into detector end 11, or may be attachable and removable by a user. For example, color-mapping wand 10 may be associated with, or provided with, a kit that includes various attachments that may be attached (e.g. one at a time or together) to detector end 11.

Detector end 11 may include one or more additional devices, detectors, or sensors. For example, detector end 11 may include a lamp or other device for illuminating a surface being mapped. Detector end 11 may include a mechanical pressure sensor or an electromagnetically activated device for detecting when detector end 11 is being placed in contact with a surface.

Color-mapping wand 10 may include a control 15. Control 15 may include, for example, one or more user operable control devices. For example, control 15 may include one or more mechanically, pneumatically, optically, thermally, or electromagnetically operable pushbuttons, switches, dials, knobs, or any other suitable control device. Control 15 may be operated so as to activate, deactivate, or control operation of one or more components of color-mapping wand 10. Control 15 may be operated to indicate a status or mode of operation of color-mapping wand 10. For example, a signal that is generated by operation of control 15 may be communicated to a processor or controller that is associated with color-mapping wand 10. Control 15 may be operated to enable removal or attachment of color applicator 16.

Color-mapping wand 10 may include one or more additional components (not shown). Such additional components may include a camera or other imaging device (for documenting operations performed using color-mapping wand 10). Additional components may include a display device (e.g. display screen or indicator light), an audio output device or a pressure sensor.

Figure 2A:
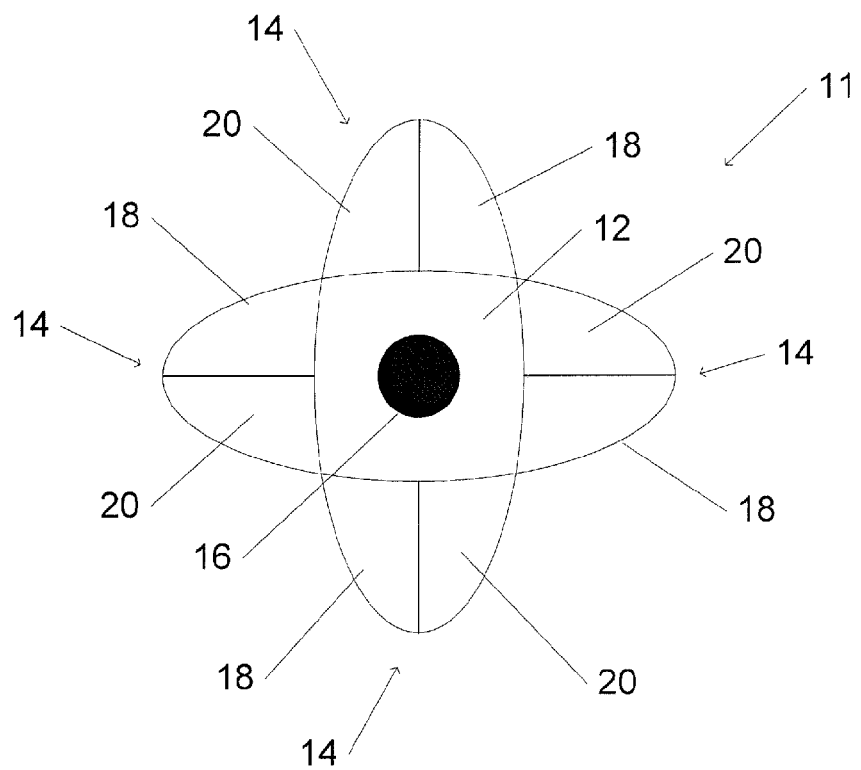
FIG. 2A schematically shows a detector end of a color-mapping wand with detectors in a fin configuration, in accordance with some embodiments of the present invention, as viewed from a surface being mapped.

A detector end 11 of color-mapping wand 10 may include an array of one or more sensors or other detection devices. FIG. 2A schematically shows a detector end of a color-mapping wand with detectors in a fin configuration, in accordance with some embodiments of the present invention, as viewed from a surface being mapped.

Detector end 11 typically includes a plurality of detector assemblies 14. Four detector assemblies 14 are shown in the embodiment shown. Other embodiments of the invention may include more than four detector assemblies, or fewer than four detector assemblies. Detectors may be included as separate or individually mounted devices, and not necessarily as part of a detector assembly 14 (e.g. together with other components or detectors).

Detector assemblies 14 may be arranged symmetrically around shaft 12 and applicator 16. An arrangement of detector assemblies 14 may be selected so as to enable accurate determination of a position of detector end 11 relative to coordinates or features of a surface, and accurate determination of a color of the surface. In other embodiments of the present invention, detector assemblies may be arranged differently. For example, an arrangement of detector assemblies may be such as to minimally interfere with handling or use of color applicator 16 (e.g. so as not to interfere with manipulation of color applicator 16 so as to effectively color a surface). Other considerations in selecting an arrangement of detector assemblies may include relative locations of sources of illumination, and avoidance of covering an aperture of a detection device with a coloring material (e.g. makeup or paint).

In the embodiment shown, detector assemblies 14 extend outward from wand shaft 12 in a fin-like manner. In other embodiments, one or more detector assemblies may be shaped or arranged differently.

In the embodiment shown, each detector assembly 14 includes detection devices in the form of a color detector 18 and a fiducial marker detector 20. Alternatively, detection devices may be distributed differently among the detector assemblies. For example, some detector assemblies may include only color detectors, while others include fiducial marker detectors. As another example, color detectors and fiducial marker detectors may coincide in their placement, or may be interspersed.

Color detector 18 is configured to measure an intensity of incident light in spectral range. For example, each color detector 18 may produce a signal (or multiple signals for different spectral ranges) that indicates an intensity of light that is reflected from a surface in one or more spectral ranges.

In some embodiments, color detector 18 may include two or more non-imaging light measurement devices. For example, a non-imaging color detector 18 may include light-gathering optics (e.g. a lens or mirror arrangement, or a collimator) and a first detector that is configured to measure intensity of incident light in a first spectral range. For example, the detector or light-gathering optics may include a spectrally selective window, mirror, or filter, may include a component for spectral separation of light (e.g. a grating or prism), or the detector may be configured to be sensitive to light only in that first spectral range.

Another, second color detector (to be understood as including another component or measurement mode of a single detector) may be configured to measure intensity of incident light in a different, second spectral range. The fields of view of the first and second detectors may at least partially overlap. Measured intensities measured by the first and second detectors may be analyzed to yield a value of the color in the region of the overlap. In a typical color measurement technique, at least three detectors that are sensitive to three different spectral ranges (e.g. red, green, and blue) may be utilized to yield a measured color.

For example, the various detectors that are sensitive to the various spectral ranges may be incorporated into a single color detector 18 of a single detector assembly 14. In such a case, some or all of the light-gathering optics may be shared among the various component detectors. Such sharing of the light-gathering optics may result in substantial overlap of the individual fields of view of the various component detectors. Color detectors 18 of different detector assemblies 14 may then have non-overlapping fields of view. In this manner, color detectors 18 of different detector assemblies 14 may be operated concurrently to concurrently measure colors of several regions of a surface. Alternatively, the fields of view of the different color detectors 18 may substantially overlap. Concurrent measurements made by the different color detectors 18 may be averaged, or otherwise statistically analyzed, to increase accuracy of the color measurement.

In another example, detectors that are sensitive to different spectral ranges may be incorporated into different color detectors 18 of different detector assemblies 14. Light gathering optics of the different color detectors 18 may be so configured such that their fields of view at least partially overlap. The different color detectors 18 may be operated concurrently so as to measure the color of a single region of a surface (e.g. a region that corresponds to the overlapping fields of view.

In another example, each color detector 18 may include an imaging detector. For example, imaging optics of the color detector 18 may form an image of a region of the surface on an array of light detecting pixels, e.g. of charge-coupled devices (CCD array). The detector array may include an arrangement of interspersed pixels that are sensitive to different spectral ranges (e.g. red, green, and blue). In this manner, a color may be measured concurrently for several adjacent regions of the surface by a single color detector 18. Another color detector 18 may be configured to image and measure the color of another set of adjacent regions of the surface. In this manner, color detectors 18 of different detector assemblies 14 may be operated concurrently to concurrently measure colors of an extended region of a surface. Alternatively, the fields of view of the different color detectors 18 may substantially overlap. Concurrent measurements made by the different color detectors 18 may be averaged, or otherwise statistically analyzed, to increase accuracy of the color measurement.

Each fiducial marker detector 20 may include a camera or other imaging detector. For example, each fiducial marker detector 20 may include imaging optics for forming an image of a fiducial marker on an image plane or surface of the detector. The image plane or surface may include a detector array (e.g. a CCD array). The imaging optics of fiducial marker detector 20 may be configured to image electromagnetic radiation in a non-visible spectral range, such as a spectral range in the ultraviolet or near infrared regions of the electromagnetic spectrum. Similarly, the detector array of fiducial marker detector 20 may be sensitive to the same non-visible spectral range of electromagnetic radiation. A non-visible spectral range to which fiducial marker detector 20 is sensitive may be selected to be a spectral range in which a coloring material (e.g. makeup or paint) that is applied to a surface is at least partially transmissive. As another example, each fiducial marker detector 20 may include an electromagnetic device, such as a radio-frequency identification (RFID) reader, that is configured to detect an electromagnetic signal from a fiducial marker in the form of an RFID tag.

Each fiducial marker detector 20 has sufficient spatial resolution in order to identify features of a fiducial marker on a surface. For example, the spatial resolution may be sufficient to distinguish features of a fiducial marker when the color-mapping wand is held in such a manner such that color applicator 16 may apply color to the surface. A fiducial marker may include a matrix barcode. A matrix barcode may be in the form of a 2.5 millimeter square containing a 32×32 array of pixels (or other size or configuration). In this case, the spatial resolution of fiducial marker detector 20 may be sufficient to distinguish individual pixels of such a matrix barcode.

The field of view of each fiducial marker detector 20 may be sufficiently wide to include at least one complete fiducial marker. The field of view may be sufficiently wide to enable reading or identifying a complete fiducial marker. The field of view may be sufficiently wide to enable reading or identifying a complete fiducial marker and a surrounding region. Thus, a complete fiducial marker may be included in an image that is acquired using fiducial marker detector 20 when the fiducial marker is not centered in the field of view. For example, a field of view of fiducial marker detector 20 may be approximately equal to a representative (e.g. average or median) spatial period of fiducial marker placement, or a representative spacing between adjacent fiducial markers.

In accordance with some embodiments of the present invention, when detector end 11 is placed near a surface, each fiducial marker detector 20 is pointed so as to image a different region of the surface. In this case, each fiducial marker detector 20 may acquire an image of a different fiducial marker. A current location of detector end 11 relative to the surface may be determined from analysis of two or more acquired images of different fiducial markers. (Accuracy of determination of the current location may be improved by analysis of more than two acquired images of different fiducial markers.)

In some circumstances, a current location of detector end 11 relative to the surface may be determined from analysis of a single acquired image of a single fiducial marker. For example, if the field of view of a fiducial marker detector 20 may be larger than a single fiducial marker. In this case, a position of detector end 11 relative to a fiducial marker may be determined from characteristics of an image of that fiducial marker such as, for example, a position of the image of the fiducial marker relative to the field of view of fiducial marker detector 20, an orientation of the image of the fiducial marker in the field of view, or perspective-related properties of the image of the fiducial marker (e.g. foreshortening or edge convergence angles). The fields of view of two or more fiducial marker detectors 20 may be made to overlap. In this case, analysis of images of a single fiducial mark that are acquired by different fiducial marker detectors 20 from different perspectives may increase the accuracy of the determination of the position of detector end 11 relative to the surface.

In the embodiment shown in FIG. 2A, detector assemblies 14 are in the form of projections that project outward from wand shaft 12. Other configurations are possible.

Figure 2B:
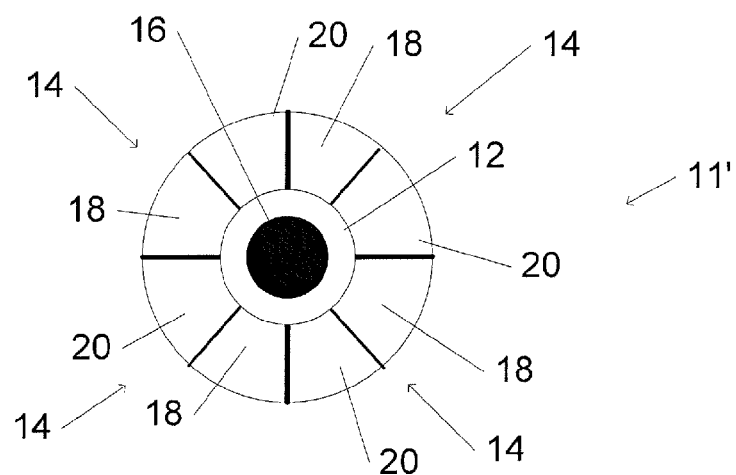
FIG. 2B schematically shows a detector end of a color-mapping wand with detectors in an annular configuration, in accordance with some embodiments of the present invention, as viewed from a surface being mapped.

FIG. 2B schematically shows a detector end of a color-mapping wand with detectors in an annular configuration, in accordance with some embodiments of the present invention, as viewed from a surface being mapped. In alternative detector end 11', as shown in FIG. 2B, detector assemblies 14 are arranged in an annular fashion about wand shaft 12. For example, an arrangement such as the arrangement of alternative detector end 11' may be advantageous when wand shaft 12 is intended to be gripped close to color applicator 16. In accordance with some embodiments of the present invention, detector assemblies 14 may be incorporated into (e.g. not extend outward beyond) wand shaft 12. In the embodiments shown in FIG. 2A and in FIG. 2B, each detector assembly 14 includes a color detector 18 and a fiducial marker detector 20. Other arrangements are possible. For example, a plurality of color detectors or of fiducial marker detectors may be incorporated in a single detector assembly. As another example, one or more single detector assemblies may incorporate only a color detector or only a fiducial marker detector (or other navigation sensor).

In accordance with other embodiments of the present invention, a current location of detector end 11 may be determined by continuous measurement (or discrete measurement at short intervals) or monitoring of an acceleration of detector end 11. In such a case, detector end 11 may incorporate an accelerometer.

Figure 3A:
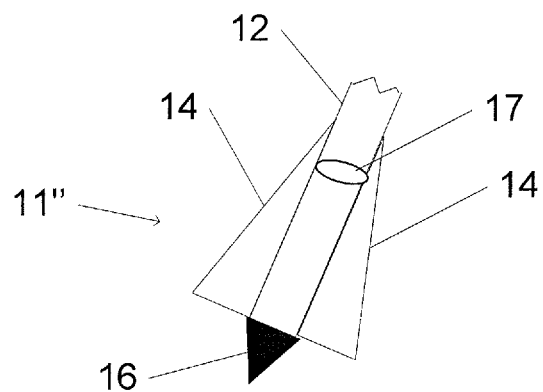
FIG. 3A schematically shows a detector end of a color-mapping wand that includes an accelerometer, in accordance with some embodiments of the present invention.
Figure 3B:
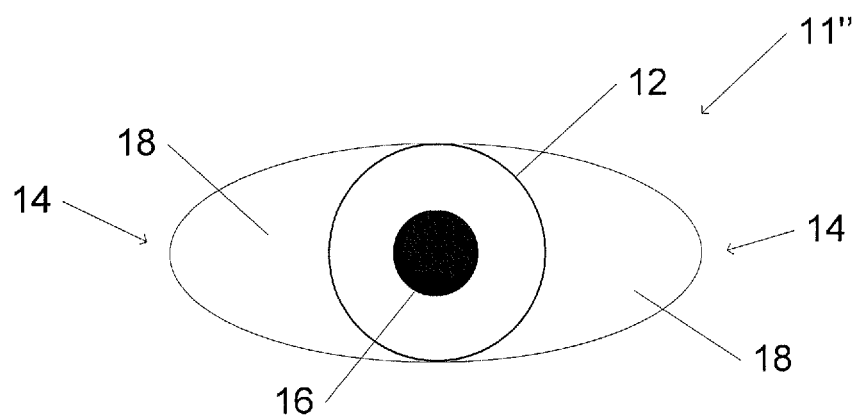
FIG. 3B schematically shows the detector end shown in FIG. 3A as viewed from a surface being mapped.

FIG. 3A schematically shows a detector end of a color-mapping wand that includes an accelerometer, in accordance with an embodiment of the present invention. FIG. 3B schematically shows the detector end shown in FIG. 3A as viewed from a surface being mapped.

Accelerometer-equipped detector end 11" is provided with accelerometer 17. Accelerometer 17 may include one or more linear or rotational acceleration sensors. An accelerometer 17 may function in conjunction with an orientation sensor, such as a gyroscope, tilt sensor, or compass. An accelerometer 17 may include, or may be incorporated into, an inertial measurement unit that includes one or more linear or rotational accelerometers, or one or more orientation sensors. For example, two or more linear acceleration sensors may be configured to measure linear acceleration along two or more different axes (at least two if a two-dimensional linear acceleration vector is to be calculated, at least three if a three-dimensional linear acceleration vector is to be calculated). Two or more rotational acceleration sensors may be configured to measure rotational acceleration about two or more different axes. Measurements by one or more linear acceleration sensors together with measurements by one or more orientation sensors may be analyzed to yield a vector acceleration.

Accelerometer 17 may be incorporated into shaft 12 as shown. In other embodiments of the present invention, some or all components of accelerometer 17 (e.g. linear or rotational acceleration sensors) may be incorporated into one or more detector assemblies 14.

Accelerometer-equipped detector end 11" may be provided with two detector assemblies 14 as shown. In other embodiments of the present invention, accelerometer-equipped detector end 11" may include more than two detector assemblies 14, or a single detector assembly 14. In other embodiments of the present invention, sensors or detectors of accelerometer-equipped detector end 11" may be arranged in an annular arrangement about wand shaft 12.

A detector assembly 14 may include a color detector 18. In other embodiments of the present invention, a detector assembly may, in addition, include a fiducial marker detector or other navigation sensor.

A detector assembly may include additional devices in addition to color detector, a fiducial marker detector, or an accelerometer. For example, a detector assembly may include an illumination source (e.g. of visible light, of non-visible electromagnetic radiation, or both). A detector assembly may include one or more additional sensing devices, e.g. for sensing the surface, for sensing ambient conditions (e.g. an ambient illumination or other environmental data), or for sensing other quantities.

Figure 4:
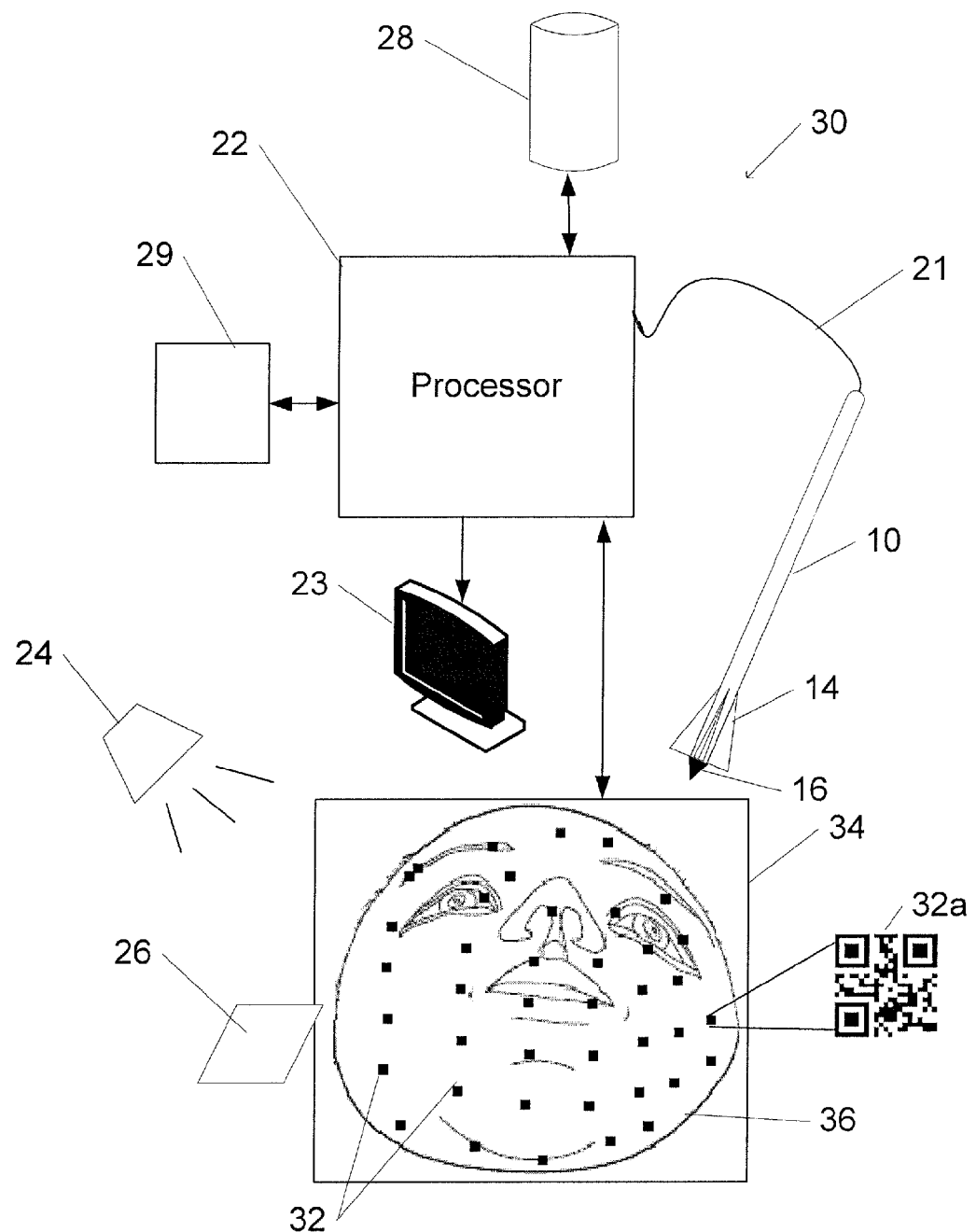
FIG. 4 illustrates a color-mapping system with a color-mapping wand, in accordance with some embodiments of the present invention.

A color-mapping wand in accordance with embodiments of the present invention may be incorporated into a color mapping system. FIG. 4 illustrates a color-mapping system with a color-mapping wand, in accordance with some embodiments of the present invention.

Color-mapping system 30 may be used to map object surface 36. Color-mapping wand 10 may be connected to processor 22 via connection 21. For example, connection 21 may include an electrically conducting cable, an optical fiber, or other data connection. Connection 21 may include a wireless connection between color-mapping wand 10 and processor 22.

Processor 22 may include one or more interconnected processing units. For example, all or part of processor 22 may be incorporated into a computer. All or part of processor 22 may be incorporated into color-mapping wand 10, e.g. into shaft 12 (FIG. 1). Processor 22 may be configured to operate in accordance with programmed instructions. For example, processor 22 may be configured to execute one or more methods for operation of color-mapping wand 10 or of color-mapping system 30.

Processor 22 may communicate with memory 29. Memory 29 may include one or more volatile or non-volatile memory devices. Part or all of memory 29 may be incorporated into or associated with a computer or with color-mapping wand 10.

Memory 29 may be used, for example, to temporarily or permanently store programmed instructions for operation of color-mapping wand 10 or color-mapping system 30. Memory 29 may be used to store data used during operation of color-mapping wand 10 or color-mapping system 30 (e.g. a table of coordinates of each fiducial marker 32, a measured acceleration, or calibration data), data generated during operation of color-mapping wand 10 or color-mapping system 30 (e.g. sensed color and position data related to object surface 36, a calculated position based on acceleration measurements), or data required for, or generated during, execution of a method of operation of color-mapping wand 10 or of color-mapping system 30 (e.g. a representation of object surface 36 or color map of object surface 36).

Processor 22 may communicate with data storage device 28. Data storage device 28 may include one or more non-volatile data storage units that are either fixed or removable. For example, data storage device 28 may include a computer readable data storage medium. Data storage device 28 may be directly connected to processor 22, or may communicate with processor 22 via a network or other wired or wireless remote connection. Part or all of memory 29 may be incorporated into or associated with a computer or with color-mapping wand 10.

Data storage device 28 may be used to store programmed instructions for operation of color-mapping wand 10 or color-mapping system 30. Data storage device 28 may be used to store data used during operation of color-mapping wand 10 or color-mapping system 30, data generated during operation of color-mapping wand 10 or color-mapping system 30 (e.g. sensed color and position data related to object surface 36), or data required for, or generated during, execution of a method of operation of color-mapping wand 10 or of color-mapping system 30 (e.g. analysis results).

Processor 22 may communicate with output device 23. For example, output device 23 may represent one or more display devices. A display device may include a screen, monitor, indicator light, or other device for visually displaying data. For example, output device 23 may display visible output in the form of a rendering of object surface 36. Output device 23 may include an audio output device, such as a speaker, buzzer, bell, alarm, earphone, or other device for generating audible output. For example, output device 23 may generate audible output in the form of a color identification, or identification of a shape or location (e.g. part of a representation of a face).

One or more components of output device 23 may be mounted on color-mapping wand 10. For example, a (e.g.

small) display screen may be mounted on output device 23. Such a display screen may enable a user to monitor results of operation of color-mapping wand 10 without looking away from color-mapping wand 10. Color-mapping wand 10 may include one or more indicator lights. The indicator lights may be operated to indicate a status of color-mapping wand 10. For example, an indicator light may be operated to indicate whether color-mapping wand 10 is currently measuring a color or whether is applying a color (or which color is being applied). An indicator light may be operated to indicate whether or not color-mapping wand 10 is currently within a previously defined region (e.g. object surface 36 or a virtual canvas or surface).

Object surface 36 may be mapped using color-mapping wand 10. Object surface 36 may represent, for example, a surface of a three-dimensional model of a human face, as shown, or of another object whose color may be mapped.

Object surface 36 may be provided with a plurality of fiducial markers 32. Each fiducial marker 32 is distinguishable from other fiducial markers 32. For example, each fiducial marker 32 may be distinguished by a unique pattern. For example, each fiducial marker 32 may include a unique matrix barcode, such as matrix barcode 32a. Matrix barcode 32a may encode information that identifies or characterizes matrix barcode 32a. For example, encoded information may include an identifying name, number, or index of matrix barcode 32a. Encoded information may include coordinates that define a location of matrix barcode 32a on object surface 36. Encoded information may include additional information, such as an original color of object surface 36 in the vicinity of matrix barcode 32a, a descriptor of a landmark on object surface 36 in the vicinity of matrix barcode 32a, or other information.

For example, fiducial markers 32 may be distributed approximately uniformly on object surface 36. Each fiducial marker 32 may encode the coordinates of that fiducial marker 32, or may encode an index to a table that contains coordinates of that fiducial marker 32. As another example, fiducial markers 32 may be located at specific landmarks on object surface 36.

Fiducial markers 32 may be made of a material that is visible in a non-visible range of the electromagnetic spectrum (e.g. ultraviolet or near infrared). Fiducial markers 32 may be rendered invisible or faintly visible by covering with a layer (e.g. of paint or other material) that is opaque to visible light but is at least partially transparent to the non-visible radiation. Fiducial markers 32 may include signal generators or transmitters such that each fiducial marker 32 produces a unique signal. For example, a signal transmitter may generate visible or non-visible radiation, may generate an electrical current that may be conducted to fiducial marker detector that is in electrical contact with object surface 36, may generate a magnetic field, or may generate an acoustical signal.

Color-mapping wand 10 may be placed on or near object surface 36 in order to produce a color map of object surface 36. Color applicator 16 of color-mapping wand 10 may be used to color (e.g. apply makeup or paint to) object surface 36. Concurrently, a color detector 18 (FIG. 2A) of detector assembly 14 may measure a color of the colored region of object surface 36. A measurement signal from color detector 18 may be communicated to processor 22 via connection 21. Similarly, a fiducial marker detector 20 (FIG. 2A) of detector assembly 14 may detect and acquire an image of a fiducial marker 32 on object surface 36. A signal that encodes the acquired image may be communicated to processor 22 via connection 21.

Accelerometer 17 (FIG. 3A) may sense a vector acceleration of color-mapping wand 10 as color-mapping wand 10 is moved. A measurement signal from (or a plurality of measurement signals from a plurality of components of) accelerometer 17 may be communicated to processor 22 via connection 21.

Object surface 36 may be mounted on or attached to module 34. For example, module 34 may be configured as a base of object surface 36 (as shown), or may be incorporated into object surface 36 or a base of object surface 36. Module 34 may include circuitry that enables communication with processor 22. For example, module 34 may be connected to processor 22. Module 34 may include encoded data that identifies or characterizes object surface 36. For example, characterizing data may be processed by processor 22 to render a representation of object surface 36 that may be displayed via output device 23. Alternatively, object surface 36 may be passive such that data that is communicated to processor 22 regarding object surface 36 is acquired by detectors on detector assembly 14 of color-mapping wand 10, or is manually input using a separate input device to processor 22.

Correct measurement by color detector 18 or by fiducial marker detector 20 may require sufficient illumination in the appropriate spectral range. Illumination source 24 may provide illumination for correct measurement by color detector 18 or by fiducial marker detector 20. For example, illumination source 24 may represent an ambient light source, such as, for example, direct or indirect sunlight or room lighting. In some cases, an illumination source 24 may represent a dedicated light source for use with color-mapping system 30. A dedicated illumination source 24 may be configured to provide a sufficient level of illumination, including visible light for operation of color detector 18, and non-visible radiation (e.g. ultraviolet or near infrared) for operation of fiducial marker detector 20. For example, a dedicated illumination source 24 may be incorporated into color-mapping wand 10, or may include a stand-alone object.

Correct color rendering by processor 22 on the basis of measurement by color detector 18 on object surface 36 may require calibration of illumination on object surface 36, e.g. from illumination source 24. Calibration may include measuring a color of reference surface 26 using color detector 18.

For example, reference surface 26 may include a chromatically neutral white or gray surface, or one or more colored surfaces. Reference surface 26 may include a colored surface that represents one or more natural skin tones, or a color of another material (e.g. a material that is used in object surface 36).

Reference surface 26 may be incorporated into object surface 36, a base of object surface 36 (e.g. module 34), or may be included in a separate object. Reference surface 26 may be distinguishable from object surface 36 (e.g. via an appropriate sensor). For example, reference surface 26 may incorporate a unique fiducial marker. A color measurement of reference surface 26 may be utilized in a calculation to separate effects of illumination from color properties of object surface 36. Reference surface 26 may include a palette or pattern containing variety of colors. The colors of the palette may be measured to define a color for virtual painting or coloring of a digital representation of a surface.

Reference surface 26 may be utilized to provide an initial or reference point or location for calculating a position based on acceleration measurements by an accelerometer 17 (FIG. 3A). For example, reference surface 26 may be placed at a fixed position relative to object surface 36. When placing color-mapping wand 10 in a standard position relative to reference surface 26 (or on an indicated, e.g. by markings, region of reference surface 26), a user may indicate, e.g. via control 15 (FIG. 1) or via an input device that is associated with processor 22, that color-mapping wand 10 is in a reference position. For example, color-mapping wand 10 may be placed at a reference point when initializing color mapping of object surface 26, or when indicated by circumstances (e.g. when color-mapping wand 10 is dropped, or when output device 23 indicates that placement of color-mapping wand 10 at the reference point is requested by processor 22).

As another example, a reference location may not be necessary. In such a case, a current position of color-mapping wand 10 may be calculated relative to an arbitrary starting position.

If color-mapping wand 10 includes an accelerometer 17, then object surface 36 need not include fiducial marks 32. Alternatively, calculation of a position of color-mapping wand 10 may be based on concurrent acceleration measurements by accelerometer 17 and detection of (e.g. widely spaced) fiducial marks 32 by a fiducial marker detector 20 (FIG. 2A or FIG. 2B).

Figure 5:
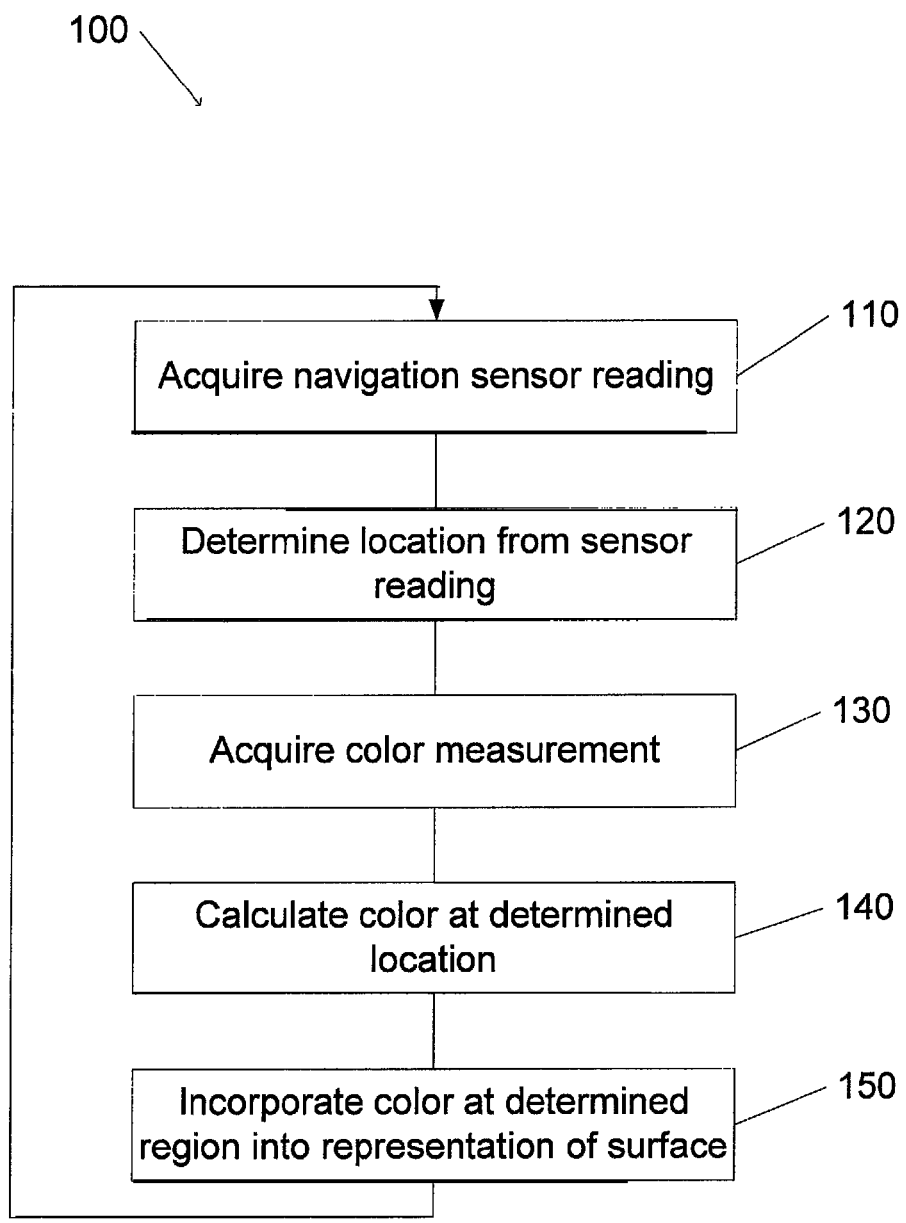
FIG. 5 is a flowchart of a method of operation of a color-mapping system with a color-mapping wand, in accordance with some embodiments of the present invention.

Processor 22 may execute a method for color mapping using color-mapping system 30. FIG. 5 is a flowchart illustrating a method of operation of a color-mapping system with a color-mapping wand, in accordance with some embodiments of the present invention. Reference is also made to components of color mapping system 30 and of color-mapping wand 10 shown in FIGS. 1-4.

It should be understood with respect to the flowcharts discussed herein, that division of an illustrated method into discrete operations represented by blocks of the flowchart has been made for convenience only. Alternative division of an illustrated method into discrete operations is possible with equivalent results. Any such alternative division of the illustrated method into discrete operations is to be considered as included within the scope of embodiments of the present invention.

It should also be understood with respect to the flowcharts discussed herein, that, unless indicated otherwise, the illustrated order of blocks that represent operations of the illustrated method has been selected for convenience only. Operations of the illustrated method that are represented by blocks of the flowchart may be executed in an alternative order, or concurrently, with equivalent results. Any such reordering of operations of the illustrated method is to be considered as included within the scope of embodiments of the present invention.

Color-mapping method 100 may be executed by processor 22 of color-mapping system 30. For example, color-mapping method 100 may be executed by processor 22 periodically at predetermined intervals (e.g. as determined by a clock that is in communication with processor 22). Repeated execution of color-mapping method 100 may be initiated by processor 22 in response to an event. An initiating event may include, for example, connecting color-mapping wand 10 to processor 22, moving color-mapping wand 10 to reference surface 26, operation of control 15, or a combination of the above. Execution of color-mapping method 100 may be triggered by processor 22 in response to a detected or sensed triggering event or condition (e.g. a motion of color-mapping wand 10 relative to object surface 36 as detected or sensed by color detector 18, accelerometer 17, or fiducial marker detector 20, by a pressure sensor or other devices that indicates when detector end 11 is in contact with object surface 11, or as otherwise sensed by a device that is in communication with processor 22). One or more operations of color-mapping method 100 may be executed when indicated by a user, e.g. operating control 15 or otherwise communicating with processor 22. Color-mapping method 100 may be executed in response to a combination of two or more of the above conditions or triggering events.

Color-mapping method 100 may be executed concurrently with using color applicator 16 to apply color to object surface 36. For example, color-mapping method 100 may be executed during the course of use of a makeup practice game or kit.

In accordance with color-mapping method 100, a navigation sensor may sense a position, or a change in position, of color-mapping wand 10 (block 110).

For example, images of one or more fiducial markers 32 of object surface 36 may be acquired, e.g. by one or more fiducial marker detectors 20 of color-mapping wand 10. Images of two or more fiducial markers 32 may be acquired concurrently by two or more fiducial marker detectors 20. The acquired image data may be temporarily or permanently stored in memory 29, data storage device 28, or in both.

As another example, an accelerometer 17 may detect or measure vector acceleration (e.g. a change in speed, rotation, rotation rate, or direction of motion) of color-mapping wand 10. The time of the acceleration measurement (e.g. as determined by a clock of processor 22) is also recorded. When object surface 36 is substantially flat, measurement of acceleration in two dimensions (in a plane that is substantially parallel to object surface 36) may be sufficient. In the case that object surface 36 is not required to be flat, an acceleration in three dimensions may be acquired.

An acquired acceleration measurement may be in the form of a vector representation of the measured acceleration. Alternatively, the acceleration measurement may be in the form of a plurality of individual linear or rotational (or both) acceleration measurements that may be processed to yield a vector representation of the measured acceleration.

The sensor data may be analyzed to determine a calculated location of detector end 11 of color-mapping wand 10 relative to object surface 36 (block 120). The determined location may be indicated on a display, e.g. of output device 23. For example, the location of detector end 11 may be indicated as a cursor on a displayed representation of object surface 36.

For example, each image of a fiducial marker 32 that is acquired by a fiducial marker detector 20 may be analyzed to extract any location-related data (e.g. coordinate-related data or an index to coordinate-related data) that is encoded in the imaged fiducial marker 32 (e.g. in the form of a matrix barcode). The location-related data may be interpreted to yield a location of the imaged fiducial marker 32 relative to object surface 36. A location and orientation of the imaged fiducial marker 32 in an imaged field of view of the fiducial marker detector 20 that acquired the image may indicate a location or orientation of color-mapping wand 10 relative to the imaged fiducial marker 32.

In the case that a plurality of images of fiducial markers 32 are concurrently acquired, by a different fiducial marker detector 20, each of the images may be interpreted to yield the location of each of the imaged fiducial markers 32. A location of detector end 11 of color-mapping wand 10 may be calculated by analysis of the acquired images. For example, in the case that the fiducial marker detectors 20 are arranged in a symmetric arrangement about detector end 11, the location of detector end 11 may be calculated as being located at the average location of the fiducial marker detectors 32 that were imaged by each of the fiducial marker detectors 20. Calculation of the location of detector end 11 from a plurality of images may also include analysis of locations and orientations of imaged fiducial markers 32 within the imaged fields of view.

Successive location measurements may be analyzed to calculate a motion of detector end 11 relative to object surface 36. For example, such a calculated motion may expedite rendering of an image that represents coloring of object surface 36.

As another example, a current location of detector end 11 of color-mapping wand 10 may be calculated by integrating over time (e.g. using a numerical integration algorithm known in the art) acquired acceleration measurements. A current velocity of detector end 11 may also be calculated from measured acceleration data For example, memory device 29 may be used to store a current calculated position of detector end 11, a most recently acquired acceleration measurement (or measured acceleration components), and one or more (depending on the integration technique that is to be applied) previous (e.g. most recent) acceleration measurements. The current position of detector end 11 may be incremented on the basis of the stored quantities.

The location of detector end 11 may be calculated relative to an initial position, e.g. a known position of reference surface 26 relative to object surface 36. For example, detector end 11 may be placed at a reference location, or in a reference position (e.g. location and orientation) in order to establish, or reestablish, an initial position. Detector end 11 may be placed at two or more locations so as to define one or more boundaries of a region in space. An image mapping application that executes color-mapping method 100 may occasionally request that the user return detector end 11 to reference surface 26. For example, re-initializing a position of detector end 11 may be indicated after an acceleration that is too large to be measured by accelerometer 17 (e.g. sensor is saturated). For example, such an immeasurable acceleration may occur if color-mapping wand 10 is dropped. Re-initialization may be indicated when contact between accelerometer 17 and processor 22 is temporarily lost.

A color measurement of a region of object surface 36 may be acquired (block 130). A color measurement may include measurement of an intensity of light that is reflected from (or that is scattered, emitted, transmitted, or otherwise originates is incident from) a region of object surface 36. For example, one or more color measurements may be made of the region of object surface 36 by one or more color detectors 18. In accordance with some embodiments, separate color detectors 18 each measure an intensity of a different spectral region (e.g. red, green, or blue). In accordance with another embodiment of the present invention, each color detector 18 may include a plurality of different spectrally sensitive sensors such that an output of a single color detector 18 may include a set of measurements in different spectral regions.

The acquired color measurements may be interpreted to yield a calculated color of a region of object surface 36 at the location of the measurement (block 140). For example, the location of the measurement may be the determined location of detector end 11 of color-mapping wand 10 as described above (in connection with block 120). A color may be calculated in accordance with a standard color coordinate system, in a color system that is specific to color-mapping system 30, or by indexing to a table of standard colors (e.g. that are provided for application to object surface 36 by color applicator 16).

A color of the region of object surface 36 may be calculated with reference to a calibration color measurement (e.g. of reference surface 26). For example, color-mapping wand 10 may be placed near reference surface 26 prior to, after, or during the course of acquiring color measurements of object surface 36. A calibration measurement may be indicated (to distinguish from a measurement of object surface 36) by user input to processor 22, e.g. via operation of control 15.

Color calibration may be utilized to separate spectral reflectance properties of object surface 36 from spectral properties of illuminating radiation, e.g., produced by illumination source 24. For example, a calibration measurement of reference surface 26 may be compared with a known or predetermined color of reference surface 26 (e.g. chromatically neutral white or gray, or another color) to determine a color of the illuminating radiation. The determined color of the illuminating radiation may be used to modify a measured color of object surface 36 to that of the surface when it is illuminated by a standard or predetermined illumination.

A calculated color of a region may be calculated as an average (or other statistical combination) of various color measurements of the region made by different color detectors 18 whose individual fields of view overlap at the region.

The calculated color at the determined location may be incorporated into a representation or rendering of object surface 36 (block 150).

For example, processor 22 may have access to a representation of object surface 36. For example, object surface 36 may be identified to processor 22 by user input or by communication with module 34 (or from analysis of an image of object surface 36 that is acquired by a camera or other imaging device). A representation of the identified object surface 36 may be retrieved from memory 29 or from data storage device 28. A calculated color at a determined location may then be incorporated into an updated current representation of the surface as a modification of the color of the corresponding region of the representation. A current representation may be displayed on output device 23. A current representation may be accessible via a network (e.g. the Internet).

As another example, a representation of object surface 36 may be constructed solely by rendered color and location data (e.g. when the shape of object surface 36 is initially unknown or has not been input to processor 22). Thus, a representation of object surface 36 at a given point in time may include undefined regions. Those undefined regions may be filled in as color-mapping wand 10 is moved over object surface 36. Various interpolation, extrapolation, and surface matching techniques may be applied to create a continuous surface representation from possibly discontinuous or partial mapping of object surface 36.

The above operations of color-mapping method 100 may be repeated periodically, or as color-mapping wand 10 is moved over object surface 36 (returning to block 110).

Color-mapping system 30 incorporating color-mapping wand 10, and color-mapping method 100, may be utilized advantageously.

For example, color-mapping system 30 may be incorporated into a makeup practice kit. A user (e.g. a child) may use color applicator 16 to apply makeup or other color to an object surface 36 in the form of a model face. Concurrently, a digital representation or rendering of the model face may be modified as the makeup is applied. The digital representation may be manipulated digitally to create additional visual effects (e.g. rotation, coloring, lighting effects, or morphing), to save the results for later retrieval, to send to or share with another user (e.g. a friend or mentor). Two or more users that have access to the digital representation may collaborate in modifying or manipulating the digital representation. For example, digital tools may be provided to simulate painting or applying makeup to the digital representation. A painting or coloring kit may similarly use color-mapping system 30. Similar use may be made to create a digital representation of an object (e.g. architectural or other model).

Color-mapping system 30 may be incorporated into a system (e.g. with audible output) for assisting a visually impaired person to identify a color. Color-mapping system 30 may be incorporated into a system for medical diagnostics (e.g. of skin-related diseases).

A color-mapping wand 10 may be modified to simulate a tool. Manipulation of the simulated tool may be monitored in order to test or improve a user's use of the tool. For example, color-mapping wand 10 may be used to simulate a writing implement to assist in learning to write (e.g. learning handwriting or calligraphy) or in acquiring other fine motor skills. Color-mapping wand 10 may be used to simulate a scalpel or other tool or instrument for use by a physician learning a surgical (including cosmetic surgery) or other medical procedure.

Figure 6:
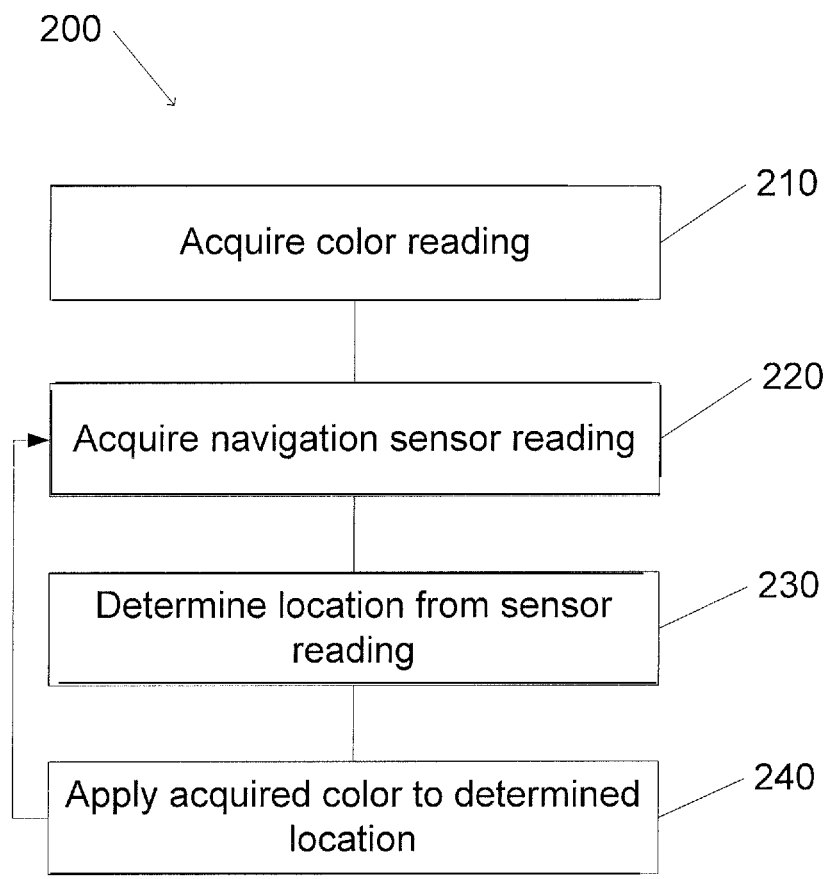
FIG. 6 is a flowchart illustrating a method of operation of a color-mapping system with a color-mapping wand to virtually color a surface, in accordance with some embodiments of the present invention.

Processor 22 may execute a method for virtual coloring of a surface using color-mapping system 30. FIG. 6 is a flowchart illustrating a method of operation of a color-mapping system with a color-mapping wand to virtually color a surface, in accordance with some embodiments of the present invention. Reference is also made to components of color mapping system 30 and of color-mapping wand 10 shown in FIGS. 1-4.

Virtual coloring method 200 may be considered to be a variation of color-mapping method 100 (FIG. 5) in which a color measurement is acquired (block 130 of FIG. 5) at one location of color-mapping wand 10 and a location is determined (blocks 110 and 120 of FIG. 5) at another location of color-mapping wand 10.

Virtual coloring method 200 may be executed by processor 22 of color-mapping system 30. For example, virtual coloring method 200 may be executed by processor 22 when color-mapping system 30 is in a virtual coloring mode. For example, a virtual coloring mode may be initiated by a user operating control 15 or an input device that is associated with processor 22. When in a virtual coloring mode, operations of virtual coloring method 200 may be executed periodically at predetermined intervals (e.g. as determined by a clock that is in communication with processor 22). Repeated execution of virtual coloring method 200 may be initiated by processor 22 in response to an event. An initiating event may include, for example, moving color-mapping wand 10 to reference surface 26, moving color-mapping wand 10 to a location that is associated with a real surface or virtual surface, operation of control 15, or a combination of the above. For example, a user may operate control 15 to initiate virtual coloring of points of the virtual surface that correspond to successive locations of color-mapping wand 10. Execution of virtual coloring method 200 may be triggered by processor 22 in response to a detected or sensed triggering event or condition (e.g. a motion of color-mapping wand 10 relative to object surface 36 as detected or sensed by color detector 18, accelerometer 17, or fiducial marker detector 20; or by a pressure sensor or other devices that indicates when detector end 11 is in contact with object surface 11). Virtual coloring method 200 may be executed when indicated by a user, e.g. operating control 15 or otherwise communicating with processor 22. Virtual coloring method 200 may be executed in response to a combination of two or more of the above conditions or triggering events.

Prior to execution of virtual coloring method 200, a virtual surface or canvas may be defined. For example, color-mapping wand 10 may be placed at one or more locations. Concurrent operation of control 15 or another input device may indicate when color-mapping wand 10 is placed at a location (e.g. as indicated by a navigation sensor) that is to be recorded. Recording the location may indicate a region in space where the virtual surface is simulated as being located. For example, one or more points may be defined for placement of a predefined shaped surface (e.g. of a face or other object, coloring of which is to be simulated). As another example, color-mapping wand 10 may be operated to indicate a plurality of points that define a virtual surface. As another example, a location of a virtual surface may be defined relative to a location of reference surface 26. As another example, a coordinate or other indication of a location may be defined or indicated using a keyboard, keypad, or pointing device that is associated with processor 22. As another example, processor 22 may automatically define a virtual surface. Various combinations of techniques for defining a location or boundary of a virtual surface may be utilized.

In accordance with virtual coloring method 200, a color detector 18 may be operated to acquire a brush color to be painted (block 210). For example, the brush color may be acquired by color measurement of a portion of reference surface 26, of object surface 36, or of any other surface or object. Color acquisition may be initiated by operation of control 15 by a user. As another example, color acquisition may be initiated by placement of color-mapping wand 10 on a colored region of reference surface 26. Placement of color-mapping wand 10 on the colored region may be detected, for example, via analysis of a navigation signal, by application of pressure to a pressure-sensitive detector, or a combination of the two.

The user may move color-mapping wand 10 to a position that is to be virtually painted with the acquired color. A navigation sensor may sense a position of color-mapping wand 10 (block 220). For example, the navigation sensor may sense the position when operation of control 15 indicates that a user wishes to apply the acquired color at the current location of color-mapping wand 10.

The navigation sensor data may be analyzed to determine a calculated location of detector end 11 of color-mapping wand 10 (block 230). The determined location may be indicated on a display, e.g. of output device 23. For example, the location of detector end 11 may be indicated as a cursor on a displayed representation of object surface 36. Analysis of the navigation sensor data may also indicate a motion of detector end 11.

For example, memory device 29 or data storage device 28 may be used to store a current calculated position of detector end 11, a most recently acquired acceleration measurement (or measured acceleration components), and one or more (depending on the integration technique that is to be applied) previous (e.g. most recent) acceleration measurements. The current position and velocity of detector end 11 may be incremented on the basis of the stored quantities.

The acquired color may be applied to the determined location in a representation of the virtual surface (block 240). For example, the virtual surface may be rendered into a digital representation that may be displayed, e.g. on output device 23.

The operations of acquiring a navigations sensor reading, determining a location, and applying the acquired color to the location (blocks 220-240) may be repeatedly executed as long as such execution is indicated. For example, repetition of the operations may be indicated as long as a control 15 is being operated (e.g. a button pressed), or until a control 15 is operated to indicate end of coloring. Thus, a continuous swath or line may be virtually colored.

Application of the acquired color to the determined location may be conditional on color-mapping wand 10 being located within the boundaries of the region of space where the virtual surface is simulated as being located. For example, application of the color to a location may be prevented, or application of color in a continuous swath may be aborted, if color-mapping wand 10 is removed from a region of space that corresponds to predetermined boundaries of the virtual surface.

The invention claimed is:

1. A color-mapping method comprising:
   operating a color detector of a freely manipulable color-mapping wand to measure an intensity of light that is incident from a region of a surface in each of a plurality of spectral regions;
   calculating a color of the region based on the measured intensity;
   operating a navigation sensor of the wand to concurrently sense two or more fiducial markers of a plurality of distributed fiducial markers to yield a position of the wand;
   determining a location of the region based on the position of the wand; and
   incorporating the calculated color into a representation of a colored surface at a position in the representation that corresponds to the determined location.

2. A color-mapping method comprising:
   operating a color detector of a freely manipulable color-mapping wand to measure an intensity of light that is incident from a region of a surface in each of a plurality of spectral regions;
   calculating a color of the region based on the measured intensity;
   operating a navigation sensor to measure a vector acceleration of the wand;
   determining a location of the region based on a position of the wand calculated by integrating the measured vector acceleration over time; and
   incorporating the calculated color into a representation of a colored surface at a position that corresponds to the determined location.

3. The method of claim 2, further comprising placing the wand at an initial position to establish a reference location.

4. A color-mapping method comprising:
   operating a color detector of a freely manipulable color-mapping wand to measure an intensity of light that is incident from a region of a surface in each of a plurality of spectral regions;
   performing a calibration measurement that includes operating said at least one color detector to measure an intensity of light that is incident from a calibration surface;
   calculating a color of the region based on the measured intensity calculated color being adjusted on the basis of a result of the calibration measurement;
   operating a navigation sensor of the wand to measure a quantity that is interpretable to yield a position of the wand;
   determining a location of the region based on the measured quantity; and
   incorporating the calculated color into a representation of a colored surface at a position that corresponds to the determined location.

5. A color-mapping method comprising:
   operating a color detector of a freely manipulable color-mapping wand to measure an intensity of light that is incident from a region of a surface in each of a plurality of spectral regions;
   calculating a color of the region based on the measured intensity;
   at a separate time from operation of the color detector, operating a navigation sensor of the wand to measure a quantity that is interpretable to yield a position of the wand; and
   incorporating the calculated color into a representation of a colored surface by applying the calculated color to a position in the representation that corresponds to the position of the wand.

* * * * *